US012691898B2

(12) United States Patent
Sekiguchi et al.

(10) Patent No.: US 12,691,898 B2
(45) Date of Patent: Jul. 28, 2026

(54) VEHICLE OBJECT DETECTION SYSTEM AND METHOD FOR DETECTING A TARGET OBJECT IN A DETECTION AREA LOCATED BEHIND A SUBJECT VEHICLE

(71) Applicants: AUMOVIO Autonomous Mobility Germany GmbH, Ingolstadt (DE); TOYOTA JIDOSHA KABUSHIKI KAISHA, Toyota (JP)

(72) Inventors: Shoichi Sekiguchi, Singapore (SG); Takahiro Kohara, Toyota (JP); Tomohiko Mochizuki, Toyota (JP); Takayoshi Nohara, Toyota (JP); Masahiro Takahashi, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 18/483,598

(22) Filed: Oct. 10, 2023

(65) Prior Publication Data

US 2024/0132099 A1      Apr. 25, 2024
US 2024/0227849 A9      Jul. 11, 2024

(30) Foreign Application Priority Data

Oct. 19, 2022      (EP) ..................................... 22202576

(51) Int. Cl.
*B60W 60/00*          (2020.01)
*B60W 40/10*          (2012.01)
(Continued)

(52) U.S. Cl.
CPC .......... *B60W 60/001* (2020.02); *B60W 40/10* (2013.01); *B60W 50/14* (2013.01);
(Continued)

(58) Field of Classification Search
None
See application file for complete search history.

(56) References Cited

U.S. PATENT DOCUMENTS 6,150,932 A      11/2000  Kenue
2005/0248445 A1*  11/2005  Matsuoka .............. G08G 1/166
                                                                   340/435
(Continued)

FOREIGN PATENT DOCUMENTS

JP          2010-198513 A      9/2010
JP          2012-48346 A       3/2012
(Continued)

OTHER PUBLICATIONS

Communication dated Feb. 18, 2026 in European Application No. 22 202 576.9.

*Primary Examiner* — Donald J Wallace
*Assistant Examiner* — Paysun Wu
(74) *Attorney, Agent, or Firm* — Sughrue Mion, PLLC

(57)          ABSTRACT

A vehicle object detection system configured to generate a judgement on whether a target object which has been detected to enter the detection area is an alert object, and to output the judgement to a warning which is configured to warn a driver of the subject vehicle that a target object is present in the detection area behind the subject vehicle based on the judgement indicating that the target object is an alert object, wherein the system is configured to delay generating the judgement until a specified period of time has elapsed from a point in time when the target object entered the detection area from an adjacent area located lateral to the detection area and/or is configured to generate the judgement based on a change in distance between the target object and the subject vehicle during said specified period of time.

13 Claims, 3 Drawing Sheets a)

b)

(51) Int. Cl.
    *B60W 50/14*        (2020.01)
    *G06T 7/20*          (2017.01)
    *G06T 7/579*       (2017.01)

(52) U.S. Cl.
    CPC ................ *G06T 7/20* (2013.01); *G06T 7/579*
        (2017.01); *B60W 2420/403* (2013.01); *B60W*
     *2420/408* (2024.01); *B60W 2554/80* (2020.02);
                            *G06T 2207/30256* (2013.01)

(56)                    References Cited

U.S. PATENT DOCUMENTS

| | | | |
|---|---|---|---|
| 2015/0057918 A1 | 2/2015 | Sugano et al. | |
| 2016/0291149 A1 | 10/2016 | Zeng et al. | |
| 2017/0282915 A1 | 10/2017 | Kim et al. | |
| 2018/0025645 A1* | 1/2018 | Schwindt | G08G 1/166 |
| | | | 701/301 |
| 2021/0380101 A1 | 12/2021 | Park | |
| 2022/0122460 A1* | 4/2022 | Takaki | B60Q 1/535 |

FOREIGN PATENT DOCUMENTS

| | | |
|---|---|---|
| JP | 2017-68447 A | 4/2017 |
| JP | 2018-144600 A | 9/2018 |
| JP | 2019-91270 A | 6/2019 |
| JP | 2022-151314 A | 10/2022 |

\* cited by examiner a) b)

VEHICLE OBJECT DETECTION SYSTEM AND METHOD FOR DETECTING A TARGET OBJECT IN A DETECTION AREA LOCATED BEHIND A SUBJECT VEHICLE

TECHNICAL FIELD

The invention relates to a vehicle object detection system for detecting a target object like a vehicle (also referred to as "target vehicle" below) in a detection area located behind a subject vehicle. Furthermore, the invention relates to a computer-implemented method for detecting a target object in a detection area located behind a subject vehicle, particularly for controlling a vehicle object detection system.

Moreover, the invention relates to driver assistance system for a vehicle, comprising such a vehicle object detection system, a corresponding computer program for carrying out the method and a respective non-transitory computer-readable medium.

BACKGROUND

Conventional Driver Assistance Systems or Advanced Driver Assistance Systems (ADAS) for vehicles are widely used, for example, in connection with conventional vehicles as well as autonomous vehicles, and may comprise such vehicle object detection systems.

Many vehicle accidents are caused by human error, which might have been avoided by means of such Advanced Driver Assistance Systems (ADAS). Commonly known safety-critical ADAS applications include pedestrian detection/avoidance, lane departure warning/correction, traffic sign recognition, automatic emergency braking and blind spot detection, for example. Long range radars are usually used for applications like emergency brake assist and adaptive cruise control, while short-range-radars are often employed in connection with applications like blind spot detection (BSD), rear-cross-traffic-alert, lane-change-assist and rear pre-crash systems, for example.

For example, such rear pre-crash systems track vehicles approaching from behind of a subject vehicle, for example, from an adjacent lane being adjacent to the lane of the subject vehicle and, in the event of an imminent collision, pre-activate safety devices such as indicators (optical or acoustic indicators), airbags, seat belts etc.

In case of a possible collision or a potential danger situation, also a rear traffic approaching notification may be output to a driver of the subject vehicle by means of such an indicator. However, even if a target vehicle enters the (own/ego) lane of the subject vehicle, it is not always necessary to output or activate an alarm warning for the attention of the driver of the subject vehicle that a vehicle is approaching from behind of the subject vehicle.

SUMMARY OF THE INVENTION

A vehicle object detection system according to the invention is for detecting a target object, like another vehicle, in a detection area located behind a subject vehicle, wherein the vehicle object detection system comprises: judging means configured to generate a judgement on whether a target object which has been detected to enter the detection area is an alert object, and to output the judgement to warning means which is configured to warn a driver of the subject vehicle that a target object is present in the detection area behind the subject vehicle based on the judgement indicating that the target object is an alert object, wherein the judging means is configured to delay generating the judgement until a specified period of time has elapsed from a point in time when the target object entered the detection area from an adjacent area located lateral to the detection area and/or is configured to generate the judgement based on a change in distance between the target object and the subject vehicle during and/or after said specified period of time.

Preferably, the distance means a distance in the longitudinal direction of the vehicle (x direction of the conventional vehicle coordinate system) or in the longitudinal direction of the detection area being the (own) lane of the subject vehicle. As a consequence, the adjacent area lateral to the detection area is located in a direction perpendicular to the longitudinal direction of the own lane or in the transverse direction of the vehicle (y direction of the conventional vehicle coordinate system).

Accordingly, the invention achieves that an alarm or warning can be suppressed until the specified time elapses when the target object like another vehicle enters the detection area (own lane) behind the subject vehicle from the adjacent area being an adjacent lane, while the target object is moving away from the subject vehicle, i.e. the distance between the target object and the subject vehicle increases during and/or after said specified period of time.

For example, the determination that the target object (target vehicle) moves away from the subject vehicle can be made on the basis of a relative velocity of the target object in the longitudinal direction as well as whether this relative velocity is 0 km/h or less.

Furthermore, this determination may be also based on an absolute value of relative lateral velocity of the target object (target vehicle) in the lateral direction as well as whether this absolute value of relative lateral velocity in the lateral direction is equal to or smaller than a specified lateral velocity. In this connection, lateral direction corresponds to the transverse direction of the subject vehicle.

Nevertheless, even if an alarm or warning can be suppressed in the situation described above where the above conditions (increase in distance and consideration of velocity) are satisfied, until the specified time elapses, an alarm or warning may still be output in different situations.

Preferably, in short terms, if any of the following conditions is met, the judging means generates a judgement indicating that the target object to be not an alert object so that the warning means does not provide an alarm: until the specified time elapses when the target object enters the area behind the vehicle from the adjacent lane and, during and/or after the above specified time has elapsed, while the target vehicle is moving away from the subject vehicle, wherein it is determined that the target object moves away if the relative vehicle velocity in the longitudinal direction of the vehicle (i.e. in the driving direction) is 0 km/h or less and, optionally, an absolute value of relative lateral velocity in the lateral direction (of the vehicle or lane) is equal to or smaller than the specified lateral velocity.

Accordingly, one of the advantageous effects achieved by the invention is to avoid unnecessary alarm warnings/activations.

The vehicle object detection system can be further configured in such a way that the judging means is configured to generate a judgement indicating that the target object is not an alert object based on an increase in the distance between the target object and the subject vehicle during and/or after said specified period of time. As mentioned above, if the target vehicle moves away during or also after said specified period of time, it may be considered to be not an alert object.

Furthermore, the vehicle object detection system according to the invention can be further modified in such a way that the judging means is configured to generate the judgement indicating that the target object is an alert object based a constant distance or decrease in the distance between the target object and the subject vehicle during said specified period of time. Accordingly, in the other case, the target vehicle is considered to be an alert object for safety reasons.

Moreover, the vehicle object detection system according to the invention can be further configured in such a way that the judging means is configured to calculate the change in the distance between the target object and the subject vehicle on the basis of a detected relative velocity of the target object with respect to the subject vehicle. For example, if a component of the detected relative velocity in the longitudinal direction of the subject vehicle is zero or less, it is judged that the distance between the target object and the subject vehicle increases.

Furthermore, the vehicle object detection system according to the invention can be further realized in such a way that the judging means is configured to calculate an absolute value of a lateral component of the detected relative velocity during and/or after the specified period of time and is configured to generate the judgement indicating that the target object is an alert object based on the absolute value of the lateral component of the detected relative velocity being equal to or smaller than a specified relative lateral velocity and the distance between the target object and the subject vehicle increasing.

Additionally, the vehicle object detection system according to the invention can be further implemented such that the judging means is configured to output the judgement to the warning means which judgement indicates to the warning means to suppress a warning even if a target object has been detected, based on the judgement indicating that the target object is not an alert object, i.e. no alert object. Accordingly, even if a target vehicle is detected, alarm warnings/activations are suppressed if the target vehicle is considered to be not an alert object.

Also, the vehicle object detection system according to the invention can be further modified such that the detection area of the subject vehicle corresponds to a region of the own lane of and behind the subject vehicle and/or the adjacent area located lateral to the detection area corresponds to an adjacent lane being adjacent to the own lane of the subject vehicle.

A driver assistance system according to the invention is for a subject vehicle and comprises: detecting means configured to detect a target object in a detection area located behind the subject vehicle, the vehicle object detection system according to the invention as described above, and warning means configured to warn a driver of the subject vehicle that a target object is present in the detection area only based on the judgement of judging means of the vehicle object detection system, indicating that the target object is an alert object.

Moreover, the driver assistance system according to the invention can be further configured such that the detecting means comprises radar sensors and/or camera sensors, used separately or in combination, configured to detect a target object in the detection area.

Furthermore, the driver assistance system according to the invention can be further modified such that the warning means is configured to output a warning to a driver of the subject vehicle that a target object is present in the detection area based on judgment indicating that the target object to is an alert object and to suppress output of a warning even if a target object is detected in the detection area by the detecting means, based on the judgement indicating that the target object is not an alert object.

A vehicle according to the invention, preferably an autonomous vehicle, comprises a driver assistance system according to the invention as described above.

A computer-implemented method according to the invention is for detecting a target object in a detection area located behind a subject vehicle, particularly for controlling a vehicle object detection system, according to the invention as described above, and comprises the following steps:

generating a judgement on whether a target object which has been detected to enter the detection area is an alert object, and outputting the judgement to warning means which warns a driver of the subject vehicle that a target object is present in the detection area behind the subject vehicle based on the judgement indicating that the target object is an alert object, wherein, in the step of generating the judgement, generating the judgement is delayed until a specified period of time has elapsed from a point in time when the target object entered the detection area from an adjacent area located lateral to the detection area and/or the judgement is generated based on a change in distance between the target object and the subject vehicle during and/or after said specified period of time.

Accordingly, the properties and advantages explained in connection with the vehicle object detection system according to the invention arise in the same or similar manner in respect of the method for detecting a target object in a detection area located behind a subject vehicle according to the present invention, which is why, in order to avoid repetitions, reference is made to the respective explanations with respect to the vehicle object detection system according to the invention.

A computer program according to the present invention comprises instructions which, when the program is executed by a computer, cause the computer to carry out the computer-implemented method according to the present invention.

A non-transitory computer-readable medium according to the present invention has stored thereon the computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

In this context, the vehicle object detection system as described in this description may include a memory which is for example used in the processing carried out in the vehicle object detection system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the vehicle object detection system as described in this description may include a processor or a "circuit". A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

With reference to the drawings, one preferred embodiment of the present invention will now be specifically described for illustrative purposes. It is to be understood that components or elements in this embodiment will be shown and described by way of examples only, but are not intended to limit this invention to them.

Figure 1:
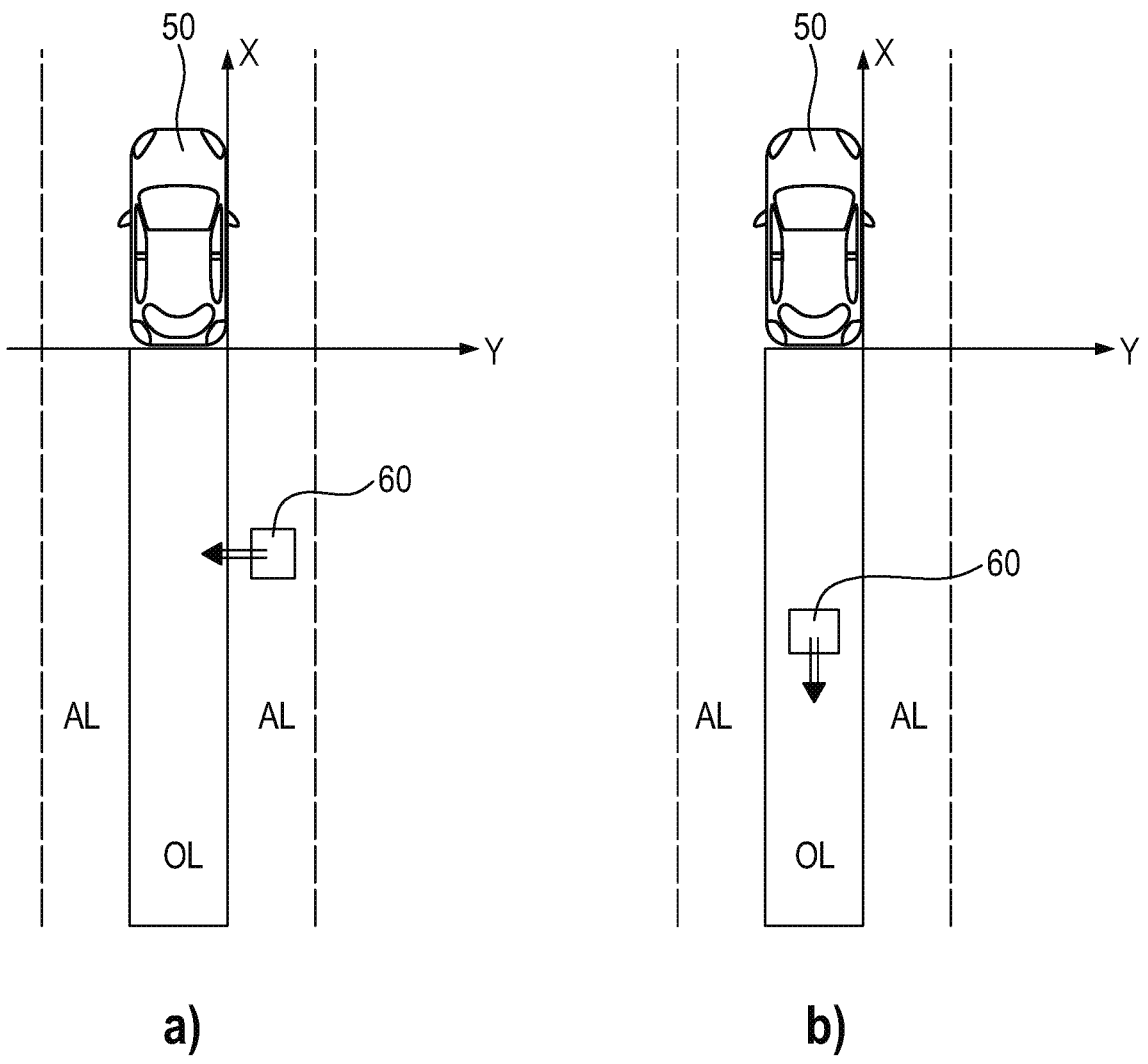
FIGS. 1 *a*) and *b*) show one embodiment of a vehicle according to the invention provided with a driver assistance system according to the invention.

FIGS. 1 *a*) and *b*) show one embodiment of a vehicle 50 (referred to as "subject vehicle" below) according to the invention, which is provided with a driver assistance system 1 according to the invention which will be described in more concrete terms in connection with FIG. 3.

Figure 3:
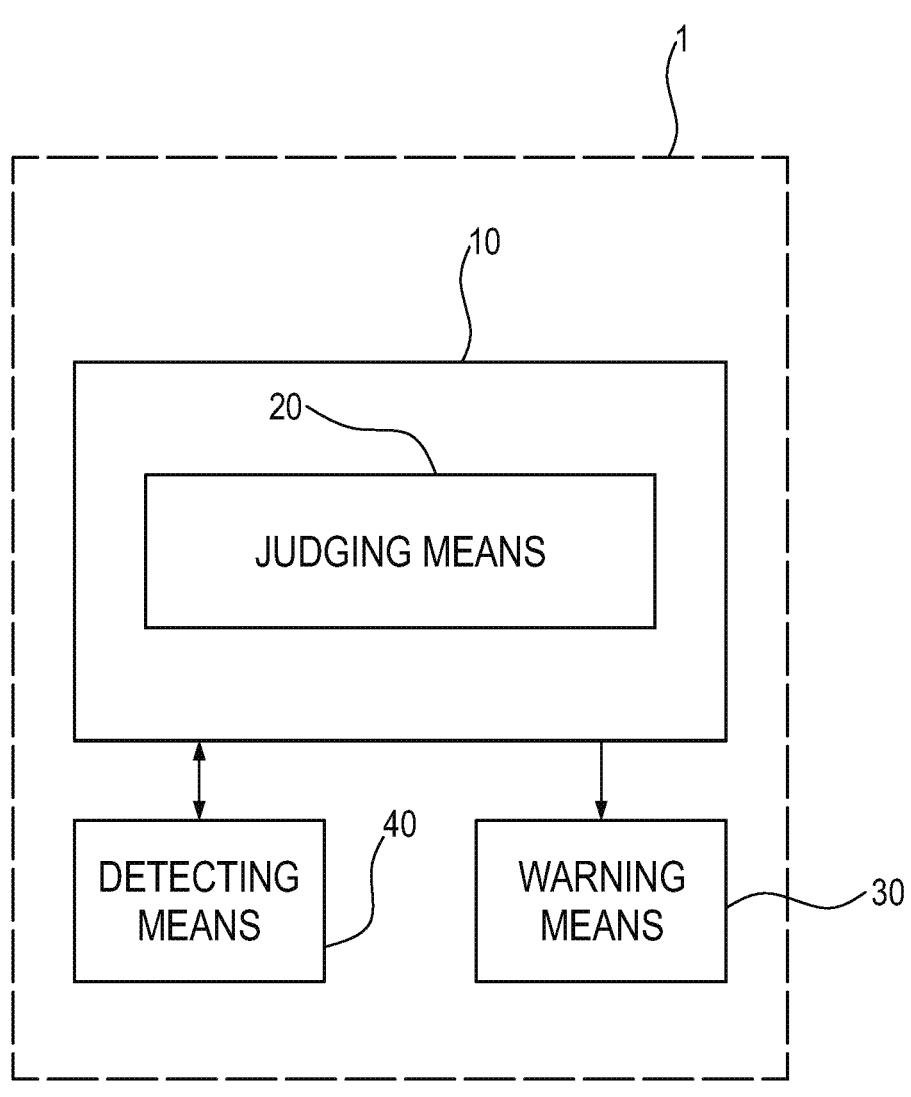
FIG. 3 shows a schematic configuration of the driver assistance system according to the invention of FIG. 1 in more detail.

FIG. 3 shows a schematic configuration of the driver assistance system 1 according to the invention of FIG. 1 in more detail.

As can be gathered from FIG. 3, the driver assistance system 1 provided in the subject vehicle 50 comprises a vehicle object detection system 10 according to the invention, detecting means 40 and warning means 30.

The detecting means 40 is configured to detect a target object 60 like another vehicle (also referred to as "target vehicle") in a detection area OL located behind the subject vehicle 50, which will be described below.

In this embodiment, the detecting means 40 comprises radar sensors and camera sensors, used separately or in combination, configured to detect a target object in the detection area OL. These sensors may be part of a conventional (rear-)-cross-traffic alert system, for example, and are capable of detecting at least a relative position of the target object 60 with respect to the subject vehicle 50, a relative velocity of the target object 60 with respect to the subject vehicle, respectively, in the x- and y-directions as shown in FIG. 1. In this case, the x-direction shown in FIG. 1 corresponds to the longitudinal direction of the vehicle, while the y-direction shown in FIG. 1 corresponds to the transverse direction of the vehicle.

The warning means 30 is configured to warn a driver of the subject vehicle 50 that a target object 60 is present in the detection area OL. For example, the warning means may be a conventional visual or acoustic indicator (display or speaker) capable of notifying the driver of the subject vehicle 50 that the target object 60 is present in the detection area OL.

The vehicle object detection system 10 according to the invention can be formed by a computer or processor and is in particular for detecting a target object 60 like the other vehicle in the detection area OL located behind the subject vehicle 50, wherein—as can be gathered from FIG. 1 in more detail—the detection area OL of the subject vehicle 50 corresponds to a region of the own lane of and behind the subject vehicle 50 and the adjacent area AL being located lateral/adjacent to the detection area OL corresponds to an adjacent lane being adjacent to the own lane of the subject vehicle 50.

The vehicle object detection system 10 comprises judging means 20 configured to judge or to generate a judgement on whether a target object 60 which has been detected to enter the detection area OL is an alert object or not an alert object, i.e. no alert object, and to output the judgement to the warning means 30. For example, the judging means 20 may be formed by a processor being a judging processor in this case.

There are specific conditions to be met, which are required that the judging means 20 generates a judgement indicating that the target object 60 present in the detection area OL is not an alert object, i.e. no alert object.

In particular, at first, the judging means 20 is configured to delay generating the judgement on whether the target object 60 is an alert object until a specified period of time has elapsed from the point in time when the target object 60 entered the detection area OL from the adjacent area AL (first condition).

Moreover, the judging means 20 is configured to generate the judgement indicating that the target object 60 which entered the detection area OL from the adjacent area AL is not an alert object only if the distance between the target object 60 and the subject vehicle 50 increases preferably after said specified period of time (second condition), wherein—in this embedment as shown in FIG. 1—the distance between the target object 60 and the subject vehicle 50 is measured in the X direction, i.e. in the longitudinal direction of the subject vehicle 50. However, it is also possible that the judging means 20 generates the judgement during and/or after said specified period of time.

In more concrete terms, the judging means 20 is configured to calculate the change of distance, i.e. increase or decrease of distance, between the target object 60 and the subject vehicle 50 on the basis of a component of a detected relative velocity of the target object 60 in the longitudinal direction of the subject vehicle with respect to the subject vehicle 50, detected by the detecting means 40, and is further configured to judge that the distance between the target object 60 and the subject vehicle 50 increases if the relative velocity is zero or less, wherein a relative velocity less than zero corresponds to a case where the absolute velocity of the target object 60 is lower than the absolute velocity of the subject vehicle 50 in the longitudinal direction of the subject vehicle 50.

Additionally, the judging means 20 is also configured to calculate a lateral component of the detected relative velocity of the target object 60 in the lateral direction of the subject vehicle 50, and to judge whether the absolute value of the lateral component of the detected relative velocity is equal to or smaller than a specified relative lateral velocity (third condition). In more detail, the judging means 20 is configured to calculate an absolute value of the lateral component of the relative velocity on the basis of a relative lateral movement, with respect to the subject vehicle (50), of the target object after the specified period of time, detected by the detecting means 40 and compares the calculated absolute value of a relative lateral velocity with the specified relative lateral velocity. If the calculated absolute value is smaller than the specified relative lateral velocity, the third condition is fulfilled.

If all of these conditions (first to third conditions) are fulfilled, the judging means 20 generates the judgement indicating that the target object 60 present in the detection area OL is not an alert object. Otherwise, if one of these conditions is not fulfilled, the target object 60 is judged to be an alert object, i.e. the judgement is generated, indicating that the target object 60 is an alert object.

In essence, the judging means 20 is thus configured to generate the judgement indicating that the target object 60 is not an alert object if the absolute value of the lateral component of relative velocity is equal to or smaller than the specified relative lateral velocity and the distance between the target object 60 and the subject vehicle 50 increases after the specified period of time. In the other case, that is, one of these conditions is not met, the judging means 20 generates the judgement indicating that the target object 60 is an alert object.

For example, the judging means 20 generates the judgement indicating that the target object 60 is an alert object if the target object 60 entered the detection area OL from the adjacent area AL and the distance between the target object 60 and the subject vehicle 50 remains constant or decreases after said specified period of time.

Accordingly, the warning means 30 warns the driver of the subject vehicle 50 that a target object 60 is present in the detection area OL only if the judging means generated the judgement indicating that the target object 60 is an alert object. In the other case, no warning is output. That is, the warning means 30 is configured to output a warning to the driver of the subject vehicle 50 that a target object 60 is present in the detection area OL if the judging means 20 generates the judgement indicating that the target object 60 is an alert object and to suppress output of a warning even if a target object 60 is detected in the detection area OL by the detecting means 40, if the judging means 20 generates the judgement after said specified period of time, indicating that the target object 60 is not an alert object.

Figure 2:
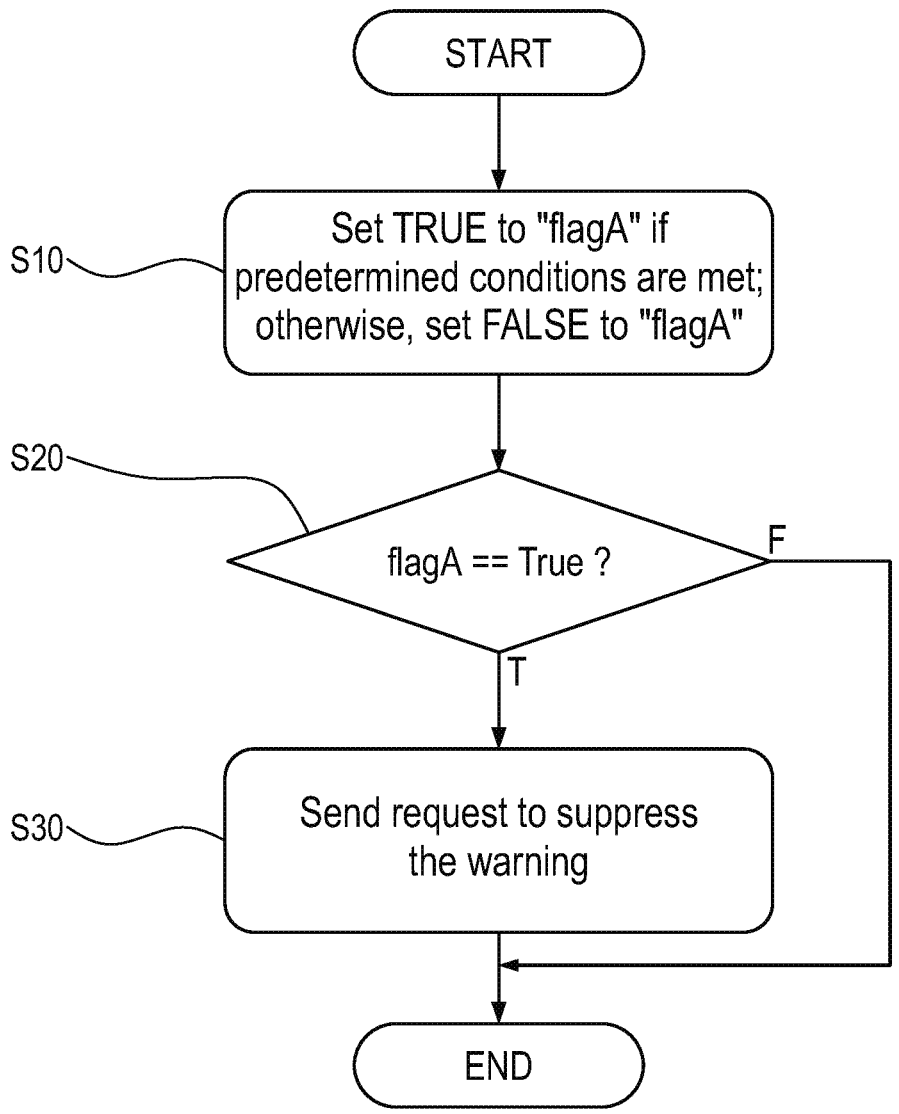
FIG. 2 shows a flowchart of a judging process carried out by the driver assistance system according to the invention of FIG. 1.

FIG. 2 shows a flowchart of a judging process carried out by the driver assistance system 1 according to the invention of FIG. 1. In more detail, the judging process as shown in FIG. 2 is carried out by the judging means 20.

As can be seen in FIG. 2, in step 10, a data structure in the form of a flag "flagA" (alarm flag for triggering an alarm/or warning process of the warning means 30) is either set to "True" or "False" dependent on the judgement of the judgement means 20. In more detail, the "flagA" is set to TRUE if the above predetermined conditions are all met. If one of the above conditions is not met, the "flagA" is set to FALSE. Next, the procedure moves to step S20 in which it is checked whether the "flagA" is set to TRUE. If it is set to TRUE, the procedure moves to step S30, otherwise step S30 is skipped and the procedure is ended.

In step S30, a request to suppress a warning/alarm is sent to the warning means 30, according to which it is indicated that the target object 60 is not an alert object so that no warning/alarm is output by the warning means 30. In other words, the judging means 20 outputs the judgement to the warning means 30 which r judgement indicates to the warning means 30 to suppress a warning even if a target object has been detected, if the judging means 20 generated the judgement after said specified period of time, indicating that the target object is not an alert object.

Next, one example of operation of the driver assistance system 1 provided with the vehicle object detection system 10 is described on the basis of FIG. 1.

As can be seen in FIG. 1a), the subject vehicle 50 is driving forward and a target object 60, i.e. another vehicle, enters the detection area OL.

Accordingly, the detecting means 40 detects the point in time when the target object entered the detection area OL, the lateral component of the relative velocity of the target object 60 and the distance between the subject vehicle 50 and the target object 60 for the specified period of time.

Then, the judging means 20 delays generating the judgement on whether the target object 60 is an alert object until the specified period of time has elapsed from the point in time when the target object 60 entered the detection area OL from the adjacent area AL, and then generates the judgment in this case indicating that the target object 60 is not an alert object as the distance between the target object 60 and the subject vehicle 50 increased from FIG. 1a) to FIG. 1b) after said specified period of time, while the lateral component of the relative velocity of the target object was below a specified lateral velocity.

Thus, in a next step, the judgement is output to the warning means 30, indicating that the target object is not an alert object so that the warning means 30 does not output a warning to the driver of the subject vehicle 50, even if a target object 60 is present in the detection area OL behind the subject vehicle 50.

The features of the invention disclosed in the foregoing description, in the drawings as well as in the claims may be essential for the realization of the invention both individually and in any combination.

The invention claimed is:

1. A vehicle object detection system (10) for detecting a target object (60) in a detection area (OL) located behind a subject vehicle (50), the vehicle object detection system (10) comprising:

judging means (20) configured to generate a judgement on whether a target object (60) which has been detected to enter the detection area (OL) is an alert object, and to output the judgement to warning means (30) which is configured to warn a driver of the subject vehicle (50) that a target object (60) is present in the detection area (OL) behind the subject vehicle (50) based on the judgement indicating that the target object (60) is an alert object, wherein the judging means (20) is configured to at least one of delay generating the judgement until a specified period of time has elapsed from a point in time when the target object (60) entered the detection area (OL) from an adjacent area (AL) located lateral to the detection area (OL), or generate the judgement based on a change in distance between the target object (60) and the subject vehicle (50) during said specified period of time.

2. The vehicle object detection system (10) according to claim 1, wherein the judging means (20) is configured to generate a judgement indicating that the target object is not an alert object based on an increase in the distance between the target object (60) and the subject vehicle (50) during said specified period of time.

3. The vehicle object detection system (10) according to claim 1, wherein the judging means (20) is configured to generate the judgement indicating that the target object (60) is an alert object based a constant distance or decrease in the distance between the target object (60) and the subject vehicle (50) during said specified period of time.

4. The vehicle object detection system (10) according to claim 1, wherein the judging means (20) is configured to calculate the change in the distance between the target object (60) and the subject vehicle (50) on the basis of a detected relative velocity of the target object (60) with respect to the subject vehicle (50).

5. The vehicle object detection system (10) according to claim 4, wherein the judging means (20) is configured to calculate an absolute value of a lateral component of the detected relative velocity during the specified period of time and is configured to generate the judgement indicating that the target object (60) is not an alert object based on the absolute value of the lateral component of the detected relative velocity being equal to or smaller than a specified relative lateral velocity and the distance between the target object (60) and the subject vehicle (50) increasing.

6. The vehicle object detection system (10) according to claim 1, wherein the judging means (20) is configured to output the judgement to the warning means (30) which judgement indicates to the warning means (30) to suppress a warning even if a target object has been detected, based on the judgement indicating that the target object is not an alert object.

7. The vehicle object detection system (10) according to claim 1, wherein the detection area (OL) of the subject vehicle (50) corresponds to at least one of a region of the own lane of and behind the subject vehicle (50), or the adjacent area (AL) corresponding to an adjacent lane being adjacent to the own lane of the subject vehicle (50).

8. A driver assistance system (1) for a subject vehicle (50), comprising:

detecting means (40) configured to detect a target object (60) in a detection area (OL) located behind the subject vehicle (50), a vehicle object detection system (10) according to claim 1, and warning means (30) configured to warn a driver of the subject vehicle (50) that a target object (60) is present in the detection area (OL) only based on the judgement of the judging means (20) of the vehicle object detection system (10), indicating that the target object (60) is an alert object.

9. The driver assistance system (1) according to claim 8, wherein the detecting means (40) comprises at least one of radar sensors or camera sensors, used separately or in combination, configured to detect a target object (60) in the detection area (OL).

10. The driver assistance system (1) according to claim 8, wherein the warning means (30) is configured to output a warning to a driver of the subject vehicle (50) that a target object (60) is present in the detection area (OL) based on judgment indicating that the target object (60) to is an alert object and to suppress output of a warning even if a target object (60) is detected in the detection area (OL) by the detecting means (40), based on the judgement indicating that the target object (60) is not an alert object.

11. An autonomous vehicle, comprising the driver assistance system (1) according to claim 8.

12. A computer-implemented method for detecting a target object (60) in a detection area (OL) located behind a subject vehicle (50), particularly for controlling a vehicle object detection system (10) according to claim 1, wherein the method comprises the following steps:

generating a judgement on whether a target object (60) which has been detected to enter the detection area (OL) is an alert object, and outputting the judgement to warning means (30) which warns a driver of the subject vehicle (50) that a target object (60) is present in the detection area (OL) behind the subject vehicle (50) based on the judgement indicating that the target object (60) is an alert object, wherein, in the step of generating the judgement, at least one of generating the judgement is delayed until a specified period of time has elapsed from a point in time when the target object (60) entered the detection area (OL) from an adjacent area (AL) located lateral to the detection area (OL), or the judgement is generated based on a change in distance between the target object (60) and the subject vehicle (50) during said specified period of time.

13. A non-transitory computer-readable medium having stored thereon a computer program comprising instructions which, when the program is executed by a computer, cause the computer to carry out the computer-implemented method of claim 12.

* * * * *